2,823,161

SUBSTITUTED TRIAZINE COMPOSITIONS FOR CHEMOTHERAPY OF COCCIDIOSIS

Russell E. Lux, Myerstown, and Ammon M. Brubaker, Sheridan, Pa., assignors to Whitmoyer Laboratories, Inc., Myerstown, Pa., a corporation of Delaware No Drawing. Application March 30, 1955
Serial No. 498,102

6 Claims. (Cl. 167—53.1)

This invention relates generally to the art of veterinary medicine and more particularly to the chemotherapy of the disease in poultry known as coccidiosis.

Coccidiosis is a protozoan infection, commonly occurring in poultry between the ages of two to fourteen weeks. It is known in the poultry raising industry that coccidiosis causes large economic losses. Mortalities in a growing flock of poultry attacked by the disease may reach 80% and in some cases even higher.

It is an object of this invention to provide therapeutic compositions which may be orally administered to poultry either as a prophylactic to prevent or guard against the occurrence of the disease in a flock or as a treatment to suppress an established infection in a flock. And whether administered at low use level as a prophylactic or at a higher use level to suppress an established infection, the therapeutic composition may be administered in effective dosage without unwanted adverse side effects, such as undue toxicity.

We have found that a dihydrotriazine, namely, 2,4-diamino-1-p-chlorophenyl-1,6-dihydro, 6,6-dimethyl-1,3,5-triazine, corresponding to the formula

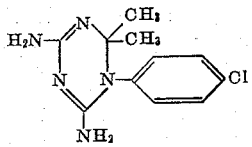

when administered orally, is very effective in small dosage in the control of coccidiosis in poultry and, in addition, this dihydrotriazine acts synergistically with certain sulfonamides. The use of a combination of the dihydrotriazine and such a sulfonamide permits of effective control of the disease at lower use levels and therefore permits of more economies in the control of the disease than is possible if only one of the drugs were used in the treatment of poultry to combat coccidiosis.

By using the dihydrotriazine together with the sulfonamide, it is possible to provide effective dosage by diminishing the amount of the sulfonamide to one-third to one-fifth of the normal dosage of the sulfonamide by the addition to the smaller amount of sulfonamide of a very small amount of the dihydrotriazine.

For the treatment of an established infection of coccidiosis in a flock of poultry we have found that the dihydrotriazine may be combined with the sulfa drugs in varying concentration ranges and effectiveness is still retained. The following tabulation illustrates effective combinations of these drugs which may be intermixed with an ingestive vehicle, such as feed mash, to produce a therapeutic ration which will provide effective dosage when fed ad libitum to poultry. It will be understood that these examples are primarily illustrative of the principle of the invention and are not to be construed as limiting the invention to these combinations alone. The percentages indicate the amounts of the drugs in feed mash based on weight.

| Dihydrotriazine, Percent | Sulfa, Percent |
|---|---|
| .003–.015% 2,4 - diamino - 1 - p - chlorophenyl - 1,6 - dihydro - 6,6-dimethyl-1,3,5-triazine. | .005–.03% Sulfaquinoxaline, .015–.16% Sulfamerazine, .02–.25% Sulfadiazine. |

For prevention, considerably lesser percentages of the components of a synergistic mixture may be required, e. g. .0005–.005% of 2,4 diamino-p-chlorophenyl, 1,6-dihydro-6,6 dimethyl-1,3,5-triazine may be combined with .0025–.0075% sulfaquinoxaline. It will be understood that sulfonamides slightly less effective than sulfaquinoxaline will be used in somewhat greater quantities in these combinations for prevention.

The dihydrotriazine, when used alone in an ingestive vehicle, is effective at low use levels in combatting coccidiosis but we prefer the combination of the dihydrotriazine and sulfonamide because it effects economies. And, although the sulfonamide which we have found to be preferable is sulfaquinoxaline, other sulfonamides such as sulfamerizine, sulfadiazine, sulfamethazine, sulfathiazole, sulfaguanidine, and those sulfa drugs known to have similar therapeutic characteristics may be substituted for sulfaquinoxaline in the combination, although they may exhibit a lesser degree of activity than sulfaquinoxaline.

When administered to poultry in an ingestive vehicle such as feed mash which is fed ad libitum to the poultry, the use level of the dihydrotriazine in the vehicle may be as low as .0025% and yet provide effective dosage to prevent the occurrence of the disease when the drug is administered as a prophylactic and the use level may be as high as .05% without undue toxic effect. When used as a prophylactic, an effective use level may range from .0025% to .0075% but if the flock is suffering from an established infection we have found that for effective dosage a use level of .01% to .03% is preferable. If the dihydrotriazine is administered by incorporating it in the drinking water in the form of a soluble salt, such as the hydrochloride, the use level may be cut to one-half of that required for effective dosage when the drug is administered by incorporating it in the dry feed mash.

A composition employing the principle of synergism has several decided advantages. The low use level of the drugs used effects savings on costs of medication. And inasmuch as lower use levels for effective dosage are permissible there are less stresses placed upon the poultry being treated than when high use levels are required for effective dosage.

It will be understood by those skilled in the art that "ingestive vehicle" as used herein means a comestible which may be partaken by the poultry and includes feed or drink such as, grain, mash, scratch, or pulverulent comestible, and water, or other comestible liquid. "Use level" will be understood to mean the amount or concentration of the drug or active compound carried in the ingestive vehicle fed ad libitum to the poultry.

We have conducted a large number of tests to determine the activity and effectiveness of the dihydrotriazines both alone and in combinations with sulfonamides. The tests, which are referred to in the art as "screening tests" were conducted in accordance with the following procedure. A large number of chicks, three to four weeks old, divided into groups of at least ten each, are infected by administering to them orally equal amounts of coccidiosis cocysts. The test groups are infected by the oral administration of 250,000 sporulated *E. tenella* cocysts. This infection will result in a certain percentage of mortality in five to eight days, if the chicks do not receive a drug which is therapeutically active in suppressing the infection. Each group of infected chicks is given a compound being tested and in each test is included a group of the same flock of infected chicks which are not given any medication (this group being designated as an "unmedicated control," U. M. C.), and also included is a group of infected chicks to which is administered a drug heretofore known to be one active to suppress coccidiosis (this group being designated as a "medicated control," M. C.). The other infected groups from the same flock are given the compound being tested, the different groups receiving varying but controlled amounts of the compound. In this way, results with a group of chicks receiving the compound being tested may be compared with both of the control groups.

An infection of *E. tenella* will also produce a certain amount of damage or lesions to the cecal walls. These are evaluated in the tests on each chick that dies during the course of the test. After eight days several survivors from each group are sacrificed for autopsy and the cecal lesions evaluated. Accordingly, in addition to comparing mortality rates in the groups, a comparison of cecal lesions of the test compound group with the control groups serves as a basis for determining therapeutic activity.

In some instances in the tests, the test compound was administered before the chicks were infected; in others it was administered after infection; and in others, at the time the chicks were infected. For example, in the tables which appear hereinafter and which show the conditions and results of a number of representative tests, it will be noted in the column labeled "Conditions," a plus (+) sign before the number indicates that the drug administration was started before infection and the number indicates the hours. Thus "+24" indicates that administration of the drug was started twenty-four hours before infection. A minus (—) sign indicates drug administration was started after infection. Thus "—48" indicates administration of the drug was started forty-eight hours after infection. Zero (0) indicates the drug administration was started at the time of infection. This variation in time of drug administration serves to determine whether the compound is therapeutically active in suppressing infection which is already established or only in preventing the occurrence or spread of cecal coccidiosis in a flock.

The compounds being tested were administered by including them intermixed in mash feed set before the chicks to be partaken ad libitum, and in some tests, in the drinking water, in amounts or concentrations as indicated; the percentages being by weight.

The results of illustrative tests are set forth in the tables which follow. These data will serve to show the activity of the compounds listed in combatting or suppressing coccidiosis at different use levels.

In Tables I and II the column "Test No." indicates the identifying number of the test; "Group Ref. No." indicates an identifying number for the group of chicks. The compound used is indicated by the Roman numeral in the "Drug" column, according to the following "Index to Tables." The column "Use level, percent" shows the percent of drug intermixed with the ingestive vehicle, which in each case in the tables was feed mash. The column labeled "Conditions" is explained above. The column "Mortality, percent" indicates the percentage of chicks in a group which died during the eight-day period of each test. The column "Cecal lesions" indicates the severity of lesions on post mortem examination of the group. As a standard of comparison, 4 is taken as severe and 1 is taken as slight. Thus figures in the column "Cecal lesions" are comparative. An unmedicated control group is designated U. M. C. and a medicated control group is designated M. C.

INDEX TO TABLES

I—Sulfaquinoxaline
II—2,4 - diamino - 5 - (p - chlorophenyl) - 6 - ethyl - pyrimidine
III—Sulfamerazine
IV—Sulfadiazine
V—Combination of .01% sulfaquinoxaline and .005% 2,4 - diamino - 5 - (p - chlorophenyl) - 6 - ethyl - pyrimidine
VI—2,4 - diamino - 1 - p - (chlorophenyl - 1,6 - dihydro - 6,6-dimethyl-1,3,5-triazine

*Table I*

| Test No. | Group Ref. No. | Drug | Drug, Percent | Conditions | Mortality, Percent | Cecal Lesions |
|---|---|---|---|---|---|---|
| 62 | 1 U. M. C | | | —48 | 40 | 3.5 |
| 62 | 2 M. C | Whitsyn 5 [1] | .25 | —48 | 0 | 2.33 |
| 62 | 3 | VI | .015 | —48 | 0 | 2.66 |
| 62 | 4 | VI | .03 | —48 | 0 | 1.33 |
| 68 | 5 U. M. C | | | —48 | 10 | 3.0 |
| 68 | 6 M. C | I | .05 | —48 | 0 | 2.7 |
| 68 | 7 | VI | .015 | —48 | 0 | 2.1 |
| 68 | 8 | VI | .03 | —48 | 0 | 1.9 |

[1] A trade name. This supplied .01% sulfaquinoxaline and .005% 2,4-diamino-5-(p-chlorophenyl)-6-ethyl-pyrimidine.

It will be observed that the chicks in test No. 68 resisted mortality, as occurs in an occasional test, using chicks having high inbred disease resistance. In such cases, drug effectiveness is observed by evaluating the cecal lesions, together with weight gains and feed consumption. In this test, groups 7 and 8 compared favorably with group 6 to which was administered .05% sulfaquinoxaline.

In Table II are set forth examples of illustrative tests that have been carried out to show the effectiveness of the dihydrotriazine in combination with various sulfonamides, more particularly, sulfaquinoxaline, sulfamerazine and sulfadiazine. For comparative purposes a column is included (Fraction of an Effective Sulfonamide Dose) which shows the reduction in the amount of sulfa over that which is normally considered to be required for effective dosage.

*Table II*

| Test No. | Group Ref. | Drug Use Level | | Fraction of an Effective Sulfonamide Dose | Conditions | Mortality, Percent | Cecal Lesions |
|---|---|---|---|---|---|---|---|
| | | Dihydrotriazine, Percent | Sulfonamide, Percent | | | | |
| 71 | 20 | | | | +72 | 30 | 2.71 |
| 71 | 21 | | .025 I | | +72 | 0 | 2.4 |
| 71 | 22 | .004 VI | .006 I | ¼ | +72 | 0 | 1.35 |
| 72 | 23 | | | | +24 | 0 | 3.4 |
| 72 | 24 | | .05 I | | +24 | 0 | 2.6 |
| 72 | 25 | .005 VI | .01 I | ⅕ | +24 | 0 | 2.2 |
| 89 | 26 | | | | +24 | 33 | 3.1 |
| 89 | 27 | | .015 II | | +24 | 11 | 1.4 |
| 89 | 28 | .005 VI | .0075 I | ½ | +24 | 0 | 2.1 |
| 62 | 29 | | | | —72 | 60 | 2.75 |
| 62 | 30 | | .1 I | | —72 | 0 | 3.0 |
| 62 | 31 | .015 VI | .02 III | ⅕ | —72 | 0 | 3.33 |
| 62 | 32 | .015 VI | .02 IV | 1/27 | —72 | 20 | 3.33 |

The results of the tests as tabulated above show that a material reduction in the amount of sulfonamide may be compensated for by using a very small amount of the dihydrotriazine in combination with the sulfa drug, even under severe test conditions (groups 31 and 32 at −72 hours). The synergism with sulfaquinoxaline is noteworthy because of the effective control afforded.

In preparing the therapeutic ration, that is, the feed or drink, which is set before the poultry to be partaken ad libitum we prefer to make up a "pre-mix." That is, predetermined quantities of the dihydrotriazine compound and the selected sulfonamide are intermixed with a quantity of a diluent such as an inactive or inert pulverulent solid, for example, bentonite or soy-bean meal. Or the pre-mix may consist of the mixture of drugs in a suitable liquid carrier. Then this pre-mix, containing a known concentration of the mixture of the active drugs and known relative quantities, may be conveniently intermixed with the feed mash or drink set before the poultry. This procedure provides a convenient way to obtain a uniform distribution in the feed of the relatively small amount of the drugs required for effective dosage. For example, a pre-mix consisting of .1 lb. of 2,4 diamino-1-p-chlorophenyl - 1,6 - dihydro-6,6-dimethyl-1,3,5-triazine and .4 lb. of sulfaquinoxaline intermixed with 4.5 lbs. of bentonite (inert diluent) will, when the five-pound batch of pre-mix is intermixed with a ton of feed, provide a feed ration containing .005% of the dihydrotriazine drug and .02% of the sulfa drug. It will be manifest that in this way it will be easy to adjust and control the concentration or use level of the active ingredients in the ingestive vehicle (such as feed mash) for oral administration to a flock of poultry. The relative amounts of the mixture of the dihydrotriazine drug and the sulfa drug in the pre-mix may vary as well as the amount of the diluent which carries the mixture. The relative amount of the sulfa drug to the dihydrotriazine in the pre-mix may, for convenience in marketing, range from a very small amount, say .25 parts, to 20 parts of the sulfa drug to 1 part of the dihydrotriazine drug in the pre-mix. Or, for marketing purposes, if desired, a liquid pre-mix may be provided which carries the active ingredients in predetermined relative amounts so that the active drugs are carried in a suitable medium which may conveniently be intermixed with the drinking water for oral administration to the poultry.

It will be understood by those skilled in the art that it is the base that is the physiologically active part of the compounds mentioned herein. Consequently, the salts, such as the acid addition salts, and other similar modifications of the dihydrotriazine compounds referred to herein are regarded as equivalents of the corresponding dihydrotriazine. It will also be understood by those skilled in the art that the use levels of therapeutic agents of the nature herein disclosed will vary under different circumstances. It is common practice in many quarters to use low levels (low concentrations) of an active drug for feeding during the growing period (the first 8 to 12 weeks for chickens) to prevent or guard against the development of an infection in a flock during the growing period. Consequently, chicks which are exposed to a small amount of infection are rendered immune to cecal coccidiosis and sudden attacks and losses are avoided or minimized. Drugs used in this manner are spoken of as prophylactic. They are prophylactic to the degree that they limit or guard against the development of the infection. On the other hand in those cases where the flock has become badly infected higher use levels may be necessary to combat and suppress the infection. The therapeutic agents provided by the invention lend themselves for use in either situation and are effective as prophylactic at low use levels; and at higher use levels without undue toxic effect for combatting and suppressing an established case of the disease.

The terms and expressions which have been employed herein are used as terms of description and not of limitation, and there is no intention in the use of such terms and expressions of excluding any equivalents of the features and compounds described and mentioned herein, but it is recognized that various modifications are possible within the spirit and scope of the invention claimed.

What is claimed is:

1. A composition for combatting the disease of coccidiosis in a flock of poultry which comprises a mixture of a feed vehicle and 2,4 - diamino - 1 - p - chlorophenyl - 1,6 - dihydro - 6,6 - dimethyl - 1,3,5 - triazine said dihydrotriazine being present within the range of .0025% to .05%.

2. A composition for combatting the disease of coccidiosis in a flock of poultry which comprises a mixture of a feed vehicle and a synergistic combination of 2,4-diamino-1 - p - chlorophenyl - 1,6 - dihydro - 6,6 - dimethyl - 1,3,5- triazine and a sulfonamide, said dihydrotriazine being present in said mixture within the range of .0005% to .05% and said sulfonamide being present in said mixture within the range of .0025% to .25%.

3. A composition according to claim 2 in which said sulfonamide is selected from the class consisting of sulfaquinoxaline, sulfadiazine and sulfamerazine.

4. A composition for combatting the disease of coccidiosis in poultry which comprises a mixture of a feed vehicle and a synergistic combination of 2,4 diamino - 1 - p - chlorophenyl - 1,6 - dihydro - 6,6 - dimethyl - 1,3,5 - triazine and sulfaquinoxaline, said dihydrotriazine being present in said mixture within the range of .0005% and .02% and said sulfaquinoxaline being present in said mixture within the range of .0025% to .05%.

5. A feed ration for combatting the disease of coccidiosis in poultry by ad libitum feeding to the poultry which comprises a feed mash in which is intermixed a combination of 2,4 diamino - 1 - p - chlorophenyl - 1,6 - dihydro - 6,6 - dimethyl - 1,3,5 - triazine and sulfonamide said dihydrotriazine being present in said mixture in a concentration of the order of .005% and said sulfaquinoxaline being present in said mixture in a concentration of the order of .02%.

6. A pre-mix composition for mixing with a comestible non-toxic feed ration to provide a therapeutic feed ration containing 2,4 diamino - 1 - p - chlorophenyl - 1,6 - dihydro - 6,6 - dimethyl - 1,3,5 - triazine and sulfaquinoxaline at a use level which provides non-toxic but effective dosage for combatting coccidiosis in poultry when said ration is fed ad libitum to the poultry which pre-mix composition comprises 2,4 - diamino - 1 - p - chlorophenyl - 1,6 - dihydro - 6,6 - dimethyl - 1,3,5 - triazine, sulfaquinoxaline and an inert carrier vehicle, said sulfaquinoxaline and said dihydrotriazine being present in said inert carrier vehicle in the ratio of .25 to 20 parts sulfaquinoxaline to 1 part of said dihydrotriazine.

References Cited in the file of this patent

Schmidt et al.: Proc. Soc. Exptl. Biol. and Med., vol. 80, May–September 1952, pp. 367–370.

Seiden: Manufacturing Chemist, vol. 21, No. 4, April 1940, pp. 155 and 156.